United States Patent [19]

Specktor et al.

[11] Patent Number: 5,098,117
[45] Date of Patent: Mar. 24, 1992

[54] APPARATUS FOR ADJUSTING CAMBER AND TOE

[75] Inventors: John Specktor, Golden Valley; Gerald A. Specktor, St. Paul, both of Minn.

[73] Assignee: Shim-A-Line, Inc., Minneapolis, Minn.

[21] Appl. No.: 87,893

[22] Filed: Jul. 31, 1987

Related U.S. Application Data

[63] Continuation-in-part of Ser. No. 546,848, Oct. 31, 1983, Pat. No. 4,684,150.

[51] Int. Cl.⁵ ............................................. B62D 17/00
[52] U.S. Cl. .................................... 280/661; 384/626; 403/4; 403/98; 411/535; D8/354
[58] Field of Search ...................... 280/661; 384/626; 403/4, 98; 411/535; D8/354

[56] References Cited

U.S. PATENT DOCUMENTS

| D. 272.392 | 1/1984 | Bigelow | D8/354 |
|---|---|---|---|
| D. 275,551 | 9/1984 | Bigelow | D8/354 |
| 774,042 | 11/1904 | Cooper | 301/132 |
| 776,971 | 12/1904 | Walsh | 285/184 |
| 1,332,626 | 3/1920 | Henegar | 411/539 |
| 1,492,561 | 5/1924 | Gabriel | 411/539 |
| 2,037,961 | 4/1936 | Boden | 74/713 |
| 2,281,555 | 5/1942 | Castiglia | 280/661 |
| 2,431,342 | 11/1947 | Perkins | 493/462 |
| 2,772,596 | 12/1956 | Trussell | 411/535 |
| 2,978,253 | 4/1961 | Weiss et al. | 280/661 |
| 3,142,352 | 7/1964 | Johansson | 180/22 |
| 4,037,680 | 7/1977 | Grove | 180/254 |
| 4,160,561 | 7/1979 | Farnam et al. | 293/1 |
| 4,195,862 | 4/1980 | Specktor et al. | 280/661 |
| 4,420,272 | 12/1983 | Ingalls et al. | 403/4 |
| 4,684,150 | 8/1987 | Specktor et al. | 280/661 |

OTHER PUBLICATIONS

Ingalls TM—Alignment Products Camber Plate 126 and Camber Plate 128, 2 pages, ©Ingalls Engineering Company, Inc. 1981.
Brake & Front End—A Babcox Publication, Jul. 1982—p. 59—*Camber Adjustment*.
Brake & Front End—A Babcox Publication, Mar. 1982—p. 19—*Rear Wheel Alignment*.
"Dog Tracking—1980 and 1981 'X' Series," Zone Technical Bulletin of Pontiac Motor Divison of General Motors Corporation, No. 81-ZT-29 dated 9/81.
"Rear Wheel Alignment—Chevrolet 'X' and J Cars," brochure of Specialty Products Copmany of Longmont, Colo.

*Primary Examiner*—Mitchell J. Hill
*Attorney, Agent, or Firm*—Kinney & Lange

[57] ABSTRACT

A shim device adjusts camber and/or toe of a wheel assembly that is attached to an axle assembly by a plurality of spaced apart bolts. The shim device includes a relatively flat tapered plate that has a indicia selectively positioned thereon to indicate the angular position of the plate with respect to the bolts such that the plate may be selectively positioned to adjust camber and/or toe a selected amount.

12 Claims, 3 Drawing Sheets

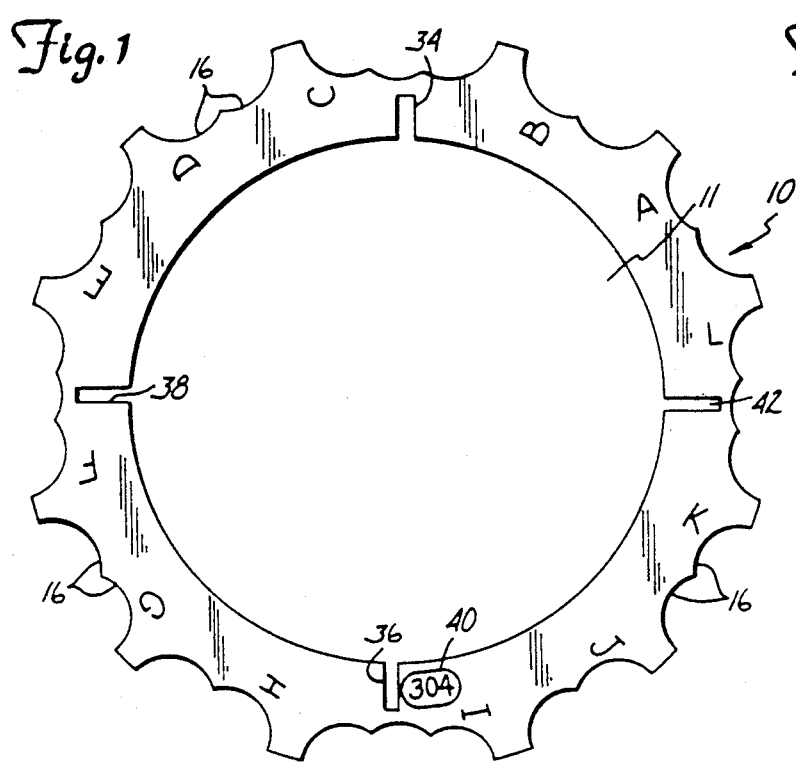
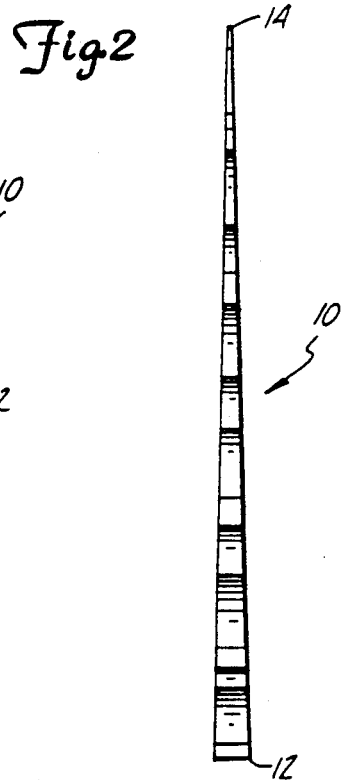
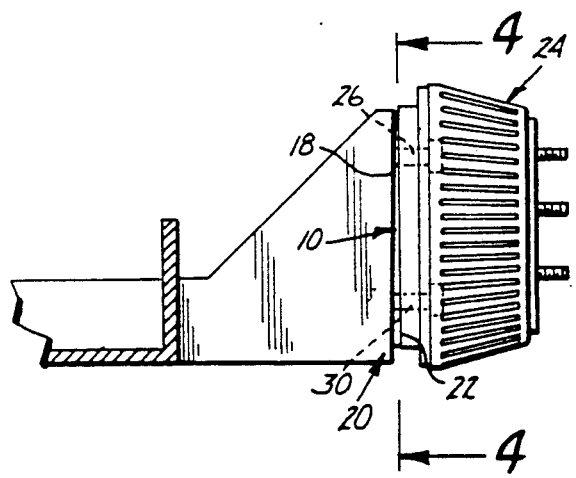
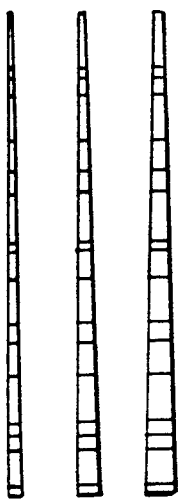
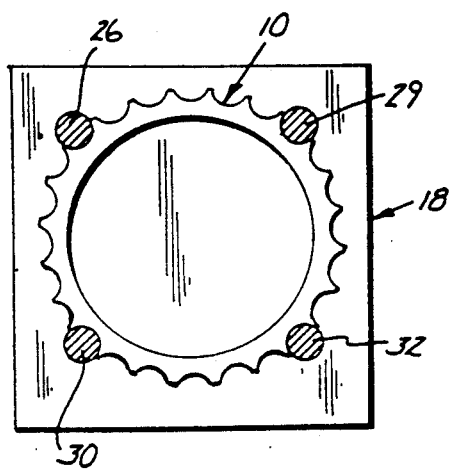

Fig. 5

APPARATUS FOR ADJUSTING CAMBER AND TOE

REFERENCE TO COPENDING APPLICATION

The present application is a continuation-in-part of application Ser. No. 546,848, filed on Oct 31, 1983 entitled "APPARATUS FOR ADJUSTING CAMBER AND TOE", which issued into U.S. Pat. No. 4,684,150 on Aug. 4, 1987.

BACKGROUND OF THE INVENTION

1. Field of the Invention

The present invention relates to shims that are used to correct camber and toe of a vehicle wheel, and in particular, it relates to a shim device that can be installed without removing the wheel mount from the axle and can be angularly indexed to adjust the position of the taper of the shim for correction of both camber and toe.

2. Description of the Prior Art

There have been various attempts at producing a shim to correct camber of a vehicle wheel. Improper camber increases tire wear significantly.

Shims are well known in the art as evidenced by the following patents:

The Farnam et al U.S. Pat. No. 4,160,561 describes a shim that is clamped between a component of a vehicle bumper assembly and a support member on a vehicle to provide desired spacing for bumper alignment. The Perkins U.S. Pat. No. 2,431,342 describes a shim device having a slot for use in machines wherein the shim is used as a spacer around a cap screw. The Castiglia U.S. Pat. No. 2,281,555 shows an annular tapered shim used to correct misalignment of knee action wheel mounts in a motor vehicle. The Boden U.S. Pat. No. 2,037,961 describes shims that are used to help mount the tapered roller bearings in an automobile differential mechanism. The shims have an arcuate configuration and are provided with deep notches. The notches engage the cap screws when in a slackened position and are inserted without removing the cap screws. The Walsh U.S. Pat. No. 776,971 shows an annular tapered part coupling which permits sections of unaligned pipe to be connected. However, none of the immediately above-mentioned patents describe shim devices suitable for mounting between an end plate of an axle and the wheel mount of a motor vehicle to adjust camber.

The Trussell U.S. Pat. No. 2,772,596 describes a shim arrangement used for adjusting both the camber and caster of an automobile. The shims are rectangularly-shaped tapered plates having a slot extending along the longitudinal axis of the plate. The shim is inserted so that the slot engages the bolt that holds the wheel onto the end plate of the axle. The portion of the shim that sticks out can be broken away along transversely positioned slots on the shim. Two shims can be used to interact with each other to correct both camber and caster. However, the correction of both camber and caster using the shim arrangement described in the Trussell Patent is very much a trial and error procedure with the shims having to be moved around until the desired camber and caster are achieved.

The Weiss et al U.S. Pat. No. 2,978,253 also has longitudinally slotted shims for correcting caster and camber by adjustment of the wheel suspension. Correction of camber and caster using the device of the Weiss Patent is also a trial and error procedure.

The Cooper U.S. Pat. No. 774,042 describes annularly shaped tapered shims for non-driven axles which may be rotated, coacting with each other providing a desired angle in the axle. The shims of the Cooper Patent, however, are not suitable for today's modern vehicles.

The Grove U.S. Pat. No. 4,037,680 describes a tapered annular ring having a plurality of bolt holes that is used as a shim for adjusting the camber between a spindle and the end plate of an axle. The openings are positioned to correspond to the position of the bolts that hold the spindle onto the end plate of the axle. The wheel and spindle is removed and the shim with tapered end down is positioned so that the bolts extend through the holes.

Similarly, the Specktor et al U.S. Pat. No. 4,195,862, assigned to the same assignee as the present application, describes an annularly tapered ring that is used as a shim to adjust camber between a wheel and an axle.

The Johansson U.S. Pat. No. 3,142,352 describes a wheeled vehicle with a shim 35 that is placed between two members, which are at right angles to the axis of the axle members of the vehicle.

The Bigelow U.S. Des. Pat. No. 272,392 illustrates a tapered shim having four slots.

SUMMARY OF THE INVENTION

The present invention includes a shim device for adjusting camber and/or toe of a wheel assembly attached to an axle assembly by a plurality of spaced-apart bolts. The device includes a relatively flat tapered plate including indicia selectively positioned thereon to indicate the angular position of the plate with respect to the bolts such that the plate may be selectively positioned to adjust camber/and toe a selected amount.

In a preferred aspect of the present invention, the plate includes bolt engaging means for engaging the spaced-apart bolts such that the plate is retained in a selected position by virtue of its engagement of the bolts. The indicia are selectively positioned with respect to the bolt engaging means to aid in indicating the angular position of the plate.

In a further aspect of the present invention, a chart is provided that relates the desired adjustments of camber and/or toe to a selected shim by the indicia positioned on the shim so that the angular position of the bolt may be preselected.

BRIEF DESCRIPTION OF THE DRAWINGS

FIG. 1 is a plan view of a shim device of the present invention.

FIG. 2 is a side view of the shim device of the present invention.

FIG. 3 is a plan view of a wheel mount and an axle assembly with the shim device of the present invention installed.

FIG. 4 is a cross-sectional view of the wheel mount and axle assembly with the shim device installed, taken along the line 4—4 in FIG. 3.

FIG. 5 is a plan view of a chart relating camber and toe adjustment to a plurality of shims, each shim having a different taper.

DETAILED DESCRIPTION OF THE PREFERRED EMBODIMENTS

Figure 6:
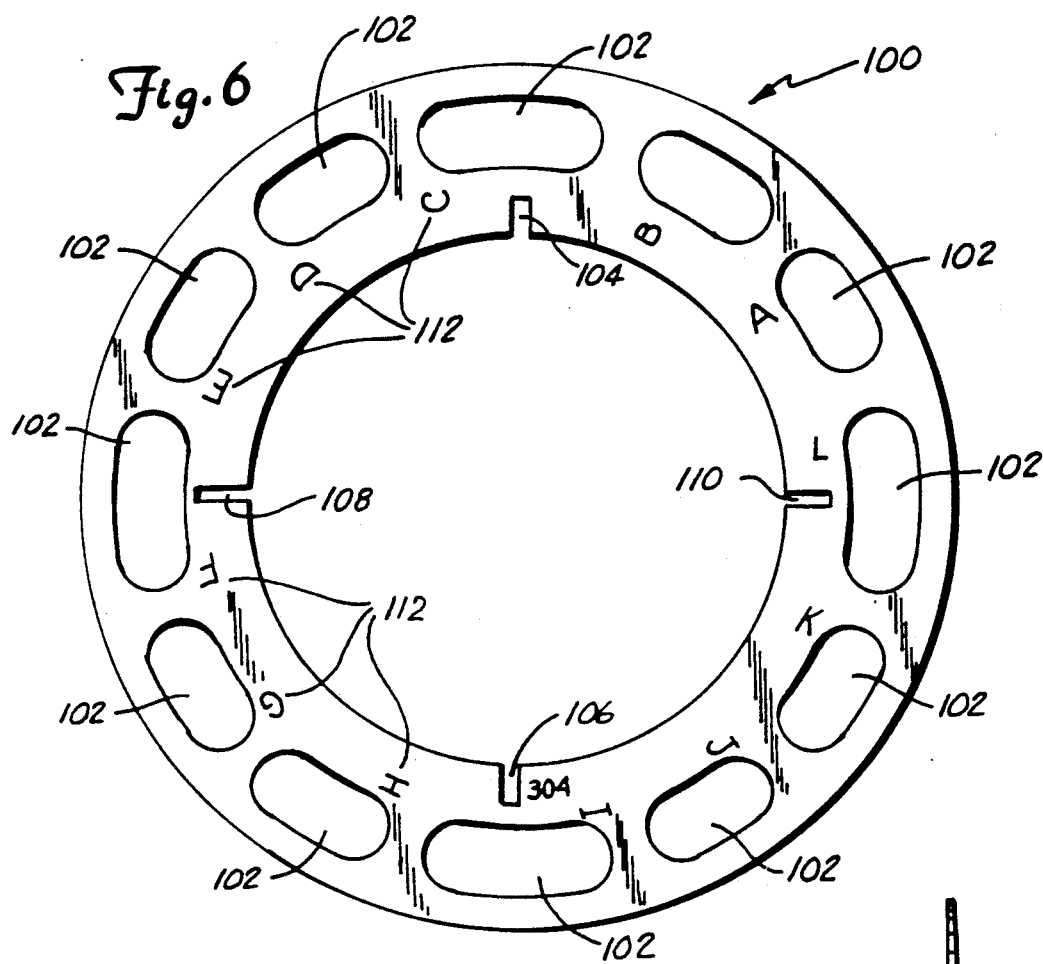
FIG. 6 is a plan view of an alternative embodiment of the shim device of the present invention.

A shim device of the present invention is generally indicated at 10 in FIG. 1. The shim device 10 is a plate with a preferred annular configuration having a central opening 11. The device 10 is tapered from a lower thick end 12 to an upper thin end 14, as illustrated in FIG. 2. The terms "lower" and "upper" as used herein to indicate the relative position of the shim device 10 in the figures and are not intended to limit the device in any way. The device 10 has a plurality of outwardly-extending bolt-engaging notches 16 disposed around the periphery. The bolt-engaging notches are preferably arcuately configured so that their edges retain the shim upon installation as will be discussed subsequently.

The shim device 10 of the present invention is used to adjust either camber or toe and preferably both camber and toe of a wheel mounted to an axle of a motor vehicle, and particularly, the rear wheels of a front-wheel drive vehicle. The shim is inserted between an end plate 18 of an axle assembly 20 and a wheel hub backer plate 22 of a wheel mount assembly 24, as illustrated in FIG. 3. On other types of wheel mount assemblies (not illustrated), the spindle has a flange behind a backing plate that mounts on a wheel axle. The wheel mount assembly 24 is attached to the axle assembly by bolts 26, 28, 30 and 32, as illustrated in FIGS. 3 and 4.

For purposes of this application, camber is defined as the vertical incline of the tires and is described in angular degrees. Toe, as used in the present application, defines side-to-side slant of the tires along their forward portion and is described in fraction of inches from a reference line positioned along an axis common to the front and rear tires.

The shim device 10 is formed of any suitable material, plastic or metal, having sufficient resilience and strength. A preferred material is aluminum. The device 10 is preferably formed by tapered sanding of flat stock due to the economics. The device can also be formed by stamping or any other machining process or combination of processes.

The shim device 10 is installed without removing the wheel mount assembly 24. In the arrangement illustrated in FIG. 4, all four bolts are loosened and only two of the bolts, for example, bolts 28 and 32, are removed. The shim device 10 is then inserted between the end plate 18 and the wheel hub backer plate 22. The shim device 10 is rotatable so that the position of the taper can be changed to adjust both camber and toe. The shim device is held in place by the bolt-engaging slots 16 abutting against the corresponding bolts. The bolts 28 and 32 that were removed are reinserted and all four bolts tightened. After tightening, all four bolts engage the edges of the bolt-engaging slots, securely holding the shim device in place. The bolt-engaging slots 16 retain the shim device in place even though one or more of the bolts, or all of the bolts, are loose.

In a preferred embodiment, the shim device 10 includes at least one set of diametrically opposed notches 34 and 36, as illustrated in FIG. 1. Preferably, the shim device includes a second set of notches 38 and 40 disposed 90° from the notches 34 and 36. The notches extend sufficiently far into the shim device 10 so that the shim device can be easily cut into two pieces using a pair of shears. Although notches are specifically shown in FIG. 1, it should be understood that score lines or other methods permitting the shim to be cut or broken in two (depending on the type of material the shim device is made of) are also includable within the scope of the present invention.

Breaking the shim device into two pieces permits installation of the shim device in arrangements where the axle and wheel assembly have a sealed rotary bearing (not shown) extending through the plane of the shim device. The shim device 10 is broken or cut in half and each half installed separately without removing the wheel mount. In a four-bolt arrangement, all the bolts that hold the wheel onto the end of the axle are loosened and two bolts are removed. The other two bolts retain the wheel mount assembly on the axle assembly. The first half of the shim is inserted and the two bolts are reinserted to retain the first half of the shim device. The other two bolts are then removed and the second half is inserted. The other two bolts are reinserted and all the bolts are tightened.

Both sets of notches 34 and 36, 38 and 40, are preferably included so that the shim device can be broken into pieces that are insertable from the sides of the wheel mount assembly regardless of the angular position of the taper. Installation of the shim from the top or the bottom of the wheel assembly is very difficult.

Figure 7:
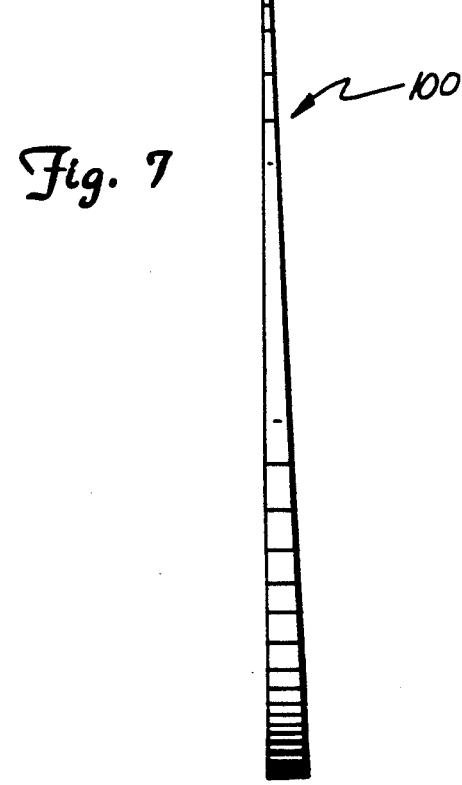
FIG. 7 is a side view of the shim device of FIG. 6.

In an alternative embodiment, generally indicated at 100 in FIGS. 6 and 7 the shim device 100 includes a plurality of slots disposed circumferentially around the plate. Similar to the shim device 10, the shim device 100 has diametrically opposed notches 104 and 106 and diametrically opposed notches 108 and 110 which are disposed at 90° from the notches 104 and 106.

The slots 102 are provided for engaging the bolts of the wheel mount assembly similarly to the notches 16 of FIGS. 1 and 2.

The present invention includes a shim arrangement in which the camber and toe are easily adjusted once a proper reading of the existing camber and toe of the vehicle are determined. A series of shim devices are provided with each shim device having a different taper. An example of one such series of shim devices is set forth in Table 1 below. Each differently tapered shim device is identified by a number that is stamped on the shim, as illustrated in FIG. 1 by reference character 40. Alternatively, the differently tapered shims are identified by different colors.

TABLE 1

| I.D. Number | Thin Edge | Thick Edge |
| --- | --- | --- |
| 301 | .015 | .030 |
| 302 | .015 | .045 |
| 303 | .015 | .061 |
| 304 | .015 | .076 |
| 305 | .015 | .091 |
| 306 | .015 | .106 |

Figure 5:
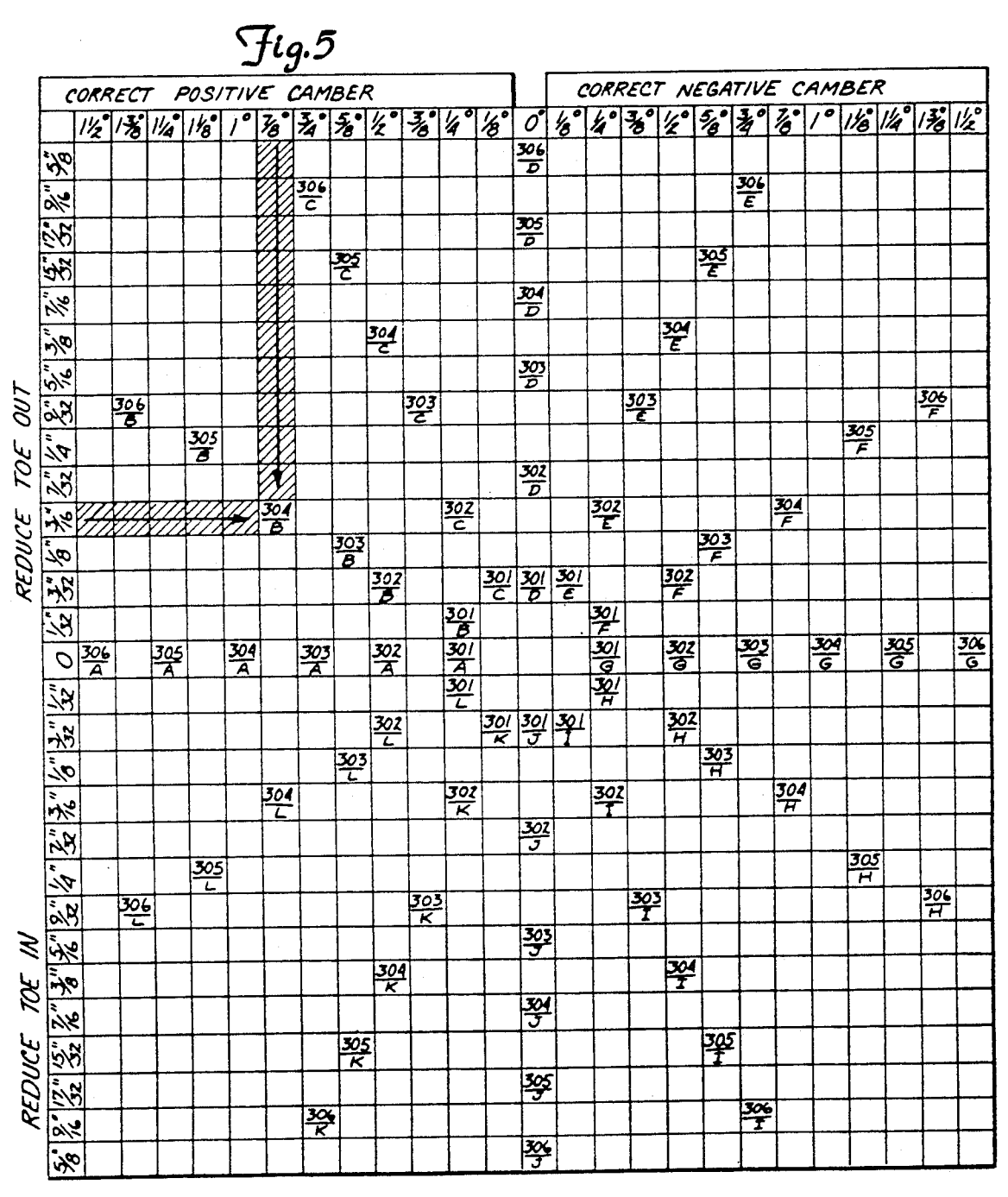

In FIG. 5, a chart is illustrated that relates adjustments in camber and adjustments in toe to a particular shim in the series in Table 1. The chart also indicates the proper angular position of the taper for the desired adjustment of both camber and toe with respect to a bolt. The taper of each shim in the series was designed to produce the incremental adjustments of camber and toe that are shown in the chart in FIG. 5.

At selected angular positions on the shim corresponding to selected bolt-engaging notches 16, indicia are provided to identify the selected bolt-engaging notches 16. Similarly, the device 100 includes indicia 112 so that the relative position of the taper of the device 100 can also be determined. The indicia identifying the notches 16 are used to determine the angular position of the taper with respect to a reference bolt. For example, in the embodiment shown in FIG. 1, the letter "A" is adjacent a selected bolt-engaging notch 16a. The notch 16a was selected so that when the notch 16a engages the upper right-hand bolt 29 (reference bolt for the right rear wheel), the taper of the shim device is positioned to substantially vertically. Positioning the shim device 10 so that the notch identified by the letter "B" engages the bolt 29 will position the taper to point to the right.

A charge, illustrated in FIG. 5, relates both camber and toe adjustments to a shim of a particular taper. Although the specific chart of FIG. 5 is herein described. It should be understood that other types of charts are contemplated as being within the scope of the present invention.

In addition, the chart indicates the relative angular position of the shim in relation to a reference bolt, as described above. The chart in FIG. 5 includes incremental adjustments for positive and negative camber along a horizontal axis. Along the vertical axis, adjustments in toe described in increments of 1/32 of an inch. The term "toe-in" refers to a forward portion of the tire pointing inwardly, while the term "toe-out" refers to the tires pointing outwardly.

Between the horizontal and vertical axis, the chart includes a grid structure having vertical and horizontal rows of blocks. Each increment of camber along the horizontal axis has associated with it a vertical row of blocks. Likewise, each increment of toe has associated with it a horizontal row of blocks. In selected blocks in the grid are disposed means for identifying a shim with a particular taper, such as indicia or color. In the chart shown, a three-figure number is used to indicate the shim. This three-figure number is identified by reference character 40 on the shim in FIG. 1, as previously described. Also included in the associated block is the letter which identifies the proper angular position of the taper to achieve a preselected camber and/or toe adjustment. To use the chart, the desired adjustment and chamber is found along the horizontal axis and the desired adjustment and toe is found along the vertical axis. A block common to both the preselected camber adjustment and the preselected toe adjustment indicates which shim should be used to achieve the adjustments in toe and camber.

In a specific example, it the desired positive camber position is a positive chamber of ¼ and the desired toe position is a toe-in of 1/32" on a right rear wheel, and the present camber of the wheel is 1° positive camber and the toe-out is 5/32", the camber needs to be adjusted ¾° and the toe-out needs to be reduced by 3/16". ¾° positive camber and 3/16" toe-out are located on the chart in FIG. 5 in the appropriate boxes along the corresponding axes. As indicated by the shading, the vertical row of boxes corresponding to the ¾° positive camber box is followed until a box common to a horizontal row of boxes corresponding to the 3/16" toe-out box is found. The common box indicates that the shim identified by the number 304 must be used to achieve the desired camber and toe-out positions. The chart also indicates that the bolt-engaging notch marked "B" on the shim must be engaged with the upper right-hand (for right rear wheel) reference bolt 29.

One preferred method of inserting the shim device 10 that ensures that the bolt-engaging notch identified as "B" engages the upper right-hand bolt is to hold the shim device with a pair of thin long-nosed pliers, tweezers or any other long-handled tool that will grip the shim. The shim is then inserted between the end plate of the axle and the wheel hub and the upper right-hand bolt for right rear wheel is engaged by the tool that is holding the shim device. The shim device is then pulled back so that the notch engages the bolt and the bolts that have been removed are inserted back into their respective holes. This method is preferred since it is difficult to see the indicia that are on the shim when the wheel assembly is attached to the axle assembly.

The procedure to adjust chamber and toe on the left rear wheel assembly is the same except that the side of the shim device facing the wheel mount assembly and the side of the shim device facing the axle assembly will be reversed. The reference bolt will change from the upper right-hand bolt to the upper left-hand bolt.

In the specific example given above, the tire is a 24 inch outside diameter tire. Since the reading is in inches, toe is a function of tire size. Therefore, for tire sizes of outside diameter of 22 inches, 8% is added to the initial toe reading. If the tire diameter is greater than 24 inches, such as 26 inches, 8% is deducted from the initial toe reading. It the tire diameter is 27 inches, 12% is deducted from the initial toe reading.

In the chart in FIG. 5, if a particular combination of camber/toe adjustment does not have a common block with indicia to designate a shim device 10, the nearest indicia-containing block should be consulted. In a situation wherein two indicia-containing blocks are within the same distance, the indicia-containing block having the closest toe value should be used.

As should be easily understood, the chart illustrated in FIG. 3 is an empirical chart that is based on the tapers of the series of shims in Table 1 which were designed for use on rear wheels of front-wheel drive cars such as a Citation manufactured by General Motors Corporation. Front-wheel drive cars of other manufacturers may, for example, require shims of different sizes along with a new chart.

If the use of a single shim device does not adjust the camber and toe the desired amount, two shim devices can be used in combination.

Although the present invention has been described with reference to preferred embodiments, workers skilled in the art will recognize that changes may be made in form and detail without departing from the spirit and scope of the invention.

What is claimed is:

1. A shim device for adjusting camber and/or toe of a wheel assembly attached to an end of an axle assembly of a motor vehicle, the wheel assembly being attached to the axle assembly by a plurality of spaced apart bolts, the shim device comprising:
   a relatively flat, tapered plate including first indicia selectively positioned thereon to indicate the angular position of the plate with respect to the bolts such that the plate may be selectively positioned to adjust camber and/or toe a selected amount.

2. The device of claim 1 and wherein the shim device further includes:
   bolt engaging means for engaging the spaced apart bolts such that the plate is retained in a selected position, and the first indicia selectively positioned on the plate with respect to the bolt engaging means to aid in determining the angular position of the plate with respect to the bolts.

3. The device of claim 1 and further including:

means for determining proper angular position of the shim including chart means when camber and toe adjustments are known so that the shim is installed by reference to the chart means and reference to the bolts that hold the wheel to the axle.

4. The device of claim 3 wherein the chart means includes a first axis including first indicia for indicating incremental camber adjustments and a second axis substantially perpendicular to the first axis and including second indicia for indicating incremental toe adjustments, the chart including a grid extending between the first and second axes and being divided into horizontal and vertical rows of blocks with each of the first and second indicia being disposed at the start of a horizontal and vertical block.

5. An apparatus for adjusting both camber and toe of a wheel assembly attached to an end of an axle assembly of a motor vehicle, the wheel assembly being attached to the axle by a plurality of bolts positioned in a spaced-apart relationship, the apparatus comprising:

a plurality of shims of different thicknesses, each shim comprising a relatively flat, tapered plate having bolt-engaging means for retaining said member is a predetermined position and having means for indicating the thickness of the shim and means for indicating angular positioning of the shim relative to the bolts; and means for determining a shim of proper thickness and for determining proper angular position of the shim including chart means when camber and toe adjustments are known so that the shim is installed to a reference point such as the bolts that hold the wheel to the axle.

6. The apparatus of claim 5 wherein the means for determining a shim of proper thickness and for determining proper angular position of the shim includes:

a first axis and first indicia, with the first axis associated with the first indicia for indicating incremental camber adjustments;

a second axis and second indicia in interactive relationship with the first axis and associated with the second indicia for indicating incremental toe adjustments;

third indicia identifying a shim of proper thickness and the shim's proper angular position with reference to the bolts that hold the wheel to the axle; and means for correlating the first and second indicia such that a shim is identified through the third indicia.

7. The apparatus of claim 6 wherein the means for determining a shim of proper thickness and for determining proper angular position include fourth indicia disposed on each shim to identify the angular position of the shim with respect to the bolts and to relate to the third indicia on the chart means.

8. The apparatus of claim 7 wherein the bolt-engaging means includes outwardly facing notches positioned on a peripheral surface of each shim.

9. The apparatus of claim 8 wherein the fourth indicia are selectively positioned to identify selected outwardly facing notches so that the outwardly facing notches are identifiable using the third indicia.

10. The apparatus of claim 7 wherein the means for determining a shim of proper thickness and for determining proper angular position of the shim includes fifth indicia that identify the thickness of the shim so that the shims are identifiable using the third indicia.

11. A method of adjusting camber and/or toe of a wheel assembly attached to an axle assembly of a motor vehicle by a plurality of spaced bolts including a reference bolt, comprising the steps of:

providing at least one shim including a relatively flat, tapered plate having indicia selectively positioned to indicate the angular position of the plate with respect to the reference bolt;

determining from reference information the position of the indicia with respect to the reference bolt which corresponds to an angular orientation of the shim which provides a selected camber and/or toe adjustment; and installing the shim between the wheel assembly and the axle assembly in such a position with respect to the indicia to provide the desired angular relation with the reference bolt and hence the desired camber and/or toe adjustment.

12. The method of claim 11 wherein a plurality of shims of different thicknesses are provided, each shim further having second indicia indicating the thickness of the shim, and determining from the reference information which of the second indicia carried by the shim corresponds to a shim needed to provide the desired camber and toe setting.

* * * * *

UNITED STATES PATENT AND TRADEMARK OFFICE
CERTIFICATE OF CORRECTION

PATENT NO. : 5,098,117
DATED : March 24, 1992
INVENTOR(S) : JOHN SPECKTOR AND GERALD A. SPECKTOR It is certified that error appears in the above-identified patent and that said Letters Patent is hereby corrected as shown below:

Col. 2, line 48, delete "bolt", insert "plate"

Col. 7, line 24, delete "is", insert "in"

Signed and Sealed this

Twenty-first Day of September, 1993

*Attest:*

BRUCE LEHMAN

*Attesting Officer*     *Commissioner of Patents and Trademarks*